United States Patent
Eng et al.

(10) Patent No.: US 6,791,987 B1
(45) Date of Patent: Sep. 14, 2004

(54) MAINTAINING SYNCHRONIZATION OVER ASYNCHRONOUS INTERFACE

(75) Inventors: Glenn Daniel Eng, Belleville (CA); John Cornelius Lynch, Belleville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/177,603

(22) Filed: Oct. 23, 1998

(51) Int. Cl.[7] .......................... H04L 12/28; H04L 12/56
(52) U.S. Cl. ................. 370/395.62; 370/509; 370/516; 375/356
(58) Field of Search ............................... 370/252, 253, 370/503, 516, 517, 518, 519, 230, 232, 233, 234, 395.1, 395.6, 395.61, 395.62; 375/356, 371, 373, 377

(56) References Cited

U.S. PATENT DOCUMENTS

| | | | | |
|---|---|---|---|---|
| 5,204,882 A | * | 4/1993 | Chao et al. | 370/395.62 |
| 5,260,978 A | * | 11/1993 | Fleischer et al. | 375/354 |
| 5,694,397 A | * | 12/1997 | Burton | 370/516 |
| 5,742,649 A | * | 4/1998 | Muntz et al. | 375/371 |
| 5,812,618 A | * | 9/1998 | Muntz et al. | 375/372 |
| 5,898,744 A | * | 4/1999 | Kimbrow et al. | 370/516 |
| 6,026,074 A | * | 2/2000 | Stadler et al. | 370/252 |
| 6,061,352 A | * | 5/2000 | Yamazaki et al. | 370/394 |
| 6,111,878 A | * | 8/2000 | Powell | 370/252 |
| 6,137,778 A | * | 10/2000 | Yoshida | 370/395.62 |
| 6,259,677 B1 | * | 7/2001 | Jain | 370/252 |
| 6,370,117 B1 | * | 4/2002 | Koraitim et al. | 370/232 |

* cited by examiner

Primary Examiner—Bob A. Phunkulh

(57) ABSTRACT

There is no common clock between two system over an asynchronous interface, such as an asynchronous network or bus. The rate of data transmission of constant bit rate data from one system can be considered constant when averaged over time. A receive system can synchronize its system clock by using timing information derived by counting received packets over a predetermined period of time.

23 Claims, 4 Drawing Sheets

MAINTAINING SYNCHRONIZATION OVER ASYNCHRONOUS INTERFACE

FIELD OF INVENTION

The invention resides in the field of data transport that does not carry timing information. In particular, the invention is concerned with synchronization of constant bit rate traffic among multiple systems without the use of timing information.

BACKGROUND OF INVENTION

Generically speaking, in FIG. 1, system A is transmitting and receiving data to and from system B over a interconnect system 10 which includes a telecommunications network, bus and the like, that is to say, systems A and B are exchanging data. The data rate at which these systems including the transport system exchange data among them is different form each other. In the figure, it is shown that system A runs its system based on its own system clock at frequency y and communicates with the network at a rate of frequency c. The network is shown as an example only and can be any interconnect mechanism, e.g., a bus etc. System B, on the other hand, has its system clock at frequency z and the data rate of communication with the network at frequency d. Of course, the communication between either system and the network is bi-directional in that the system or network transmits and receives data from the other end at the specified frequency. Ideally the data rates for system A and system B are fixed at the same frequency, i.e. c=d. If, however, frequency d of system B is larger (faster) than frequency c of system A, then system B will be consuming data at a faster rate than system A is transmitting. System B will need to insert some kind of data. In the other direction at the other end, system A is consuming data at a slower rate than system B is transmitting and at some point data will overflow system A's buffer causing loss data.

Voice and other constant bit rate traffic have a source system and a target system operate at the same bit rate. This is required such that the target system does not experience overflow (if the target is slower than that of the source) or underflow (if the target is faster than that of the source). If the target system and source system are directly connected or can be traced to the same clock, then they can maintain the same bit rate. This is shown in FIG. 2. A synchronous network or bus 12 will work at a common clock with frequency a. The connections between system A and the synchronous network and the connection between system B and the synchronous network will be a multiple of frequency a (in this case x). System A and system B will monitor the physical connection between the system and the network and modify their receive and transmit rate based on the network. Information transfer is now synchronized and there will be no lost data or extra data.

Unlike the synchronous system in which an exclusive path must be maintained for a duration of a call between the source system and destination system, in an asynchronous system, of which a packet network is a good example, the network transports a packet of data through one segment (route) after another of a path at a time until the packet reaches the destination system. Routes are selected by the network using certain criteria and therefore it is possible that a different packet of the same traffic travels through different routes to the same destination system. In an asynchronous network, a packet of data (or a burst of data packets) is launched toward a destination but usually the time of arrival at the destination is not guaranteed. The asynchronous networks, however, are very efficient because real time communication routes are only set up when needed and best routes can be selected for every packet.

As shown in all the attached figures, the medium through which two systems exchange data may be a network or it can be a bus which runs at its set frequency. In a synchronous environment, the both systems can refer to the bus frequency for timing.

Ever since the first practical packet systems were put into service there has been a desire to take advantage of the efficiency of packet systems for the transmission of the digitally encoded speech signals used in telephony. One of the most efficient and convenient and widely available data communications services is provided by the well known Internet. The Internet is implemented across various packet systems, operated in accordance with the Internet Protocol (IP). The IP is convenient as it permits communications from any source to any destination without the source and destination having to perform any actions in concert. In the last few years voice communication via personal computers using the IP has become popular.

But over an asynchronous system such has embedded asynchronous bus (e.g. CPCI(Compact PCI), VME, SBUS, PCI bus, ATM and Internet), there are no ways to transmit the bit rate clock or to synchronize to the same clock. The PCI bus is "Peripheral Component Interconnect" is a popular bus used in personal computers for attachment of PC peripherals i.e. video card. This would cause buffer over/under flow. Problems with the asynchronous networks are that the delay in arrival of packets at the destination is more or less irregular (jittery) and furthermore even the order of the packets may change at arrival.

To solve the over/under flow problems, it has been suggested that for video/PCM (voice, telephony) traffic, a large buffer should be used and when it empties recreate buffer. In other words, this is called "slip buffer". Incoming data is stored in an elastic buffer while it is emptied by the system. If overflow occurs the elastic buffer is overwritten and the previous data is lost. If underflow occurs the elastic buffer is re-read causing the appearance of the data being received twice.

Another solution is to use DSP/algorithms to fix data loss problems. This requires the use of processor/DSP to fix lost/extra data but the processor/DSP can be quite expensive if many channels are used. If data is lost, algorithms will be required to verify data and retransmit any corrupted data such as lost bytes or repeated bytes.

A copending patent application Ser. No. 08/982,925 filed on Dec. 2, 1997 Ward et al has an assignee common to that of the present application. This application describes an invention that reduces the effects of non-synchronized operation and thereby improves the quality of the perceived speech being audibly reproduced from voice signal data transported via an IP or the like.

In the application, a jitter buffer is provided at the receiving entity to store frames of voice signal derived from incoming packets, order of packets being maintained with reference to the time stamps contained therein. Upon initiation of a call, consumption of data out of the buffer is delayed until the jitter buffer exceeds some predetermined amount of fullness where after received frames are made available for processing at a regular rate. Ideally as the rate of delivery fluctuates the fullness of the jitter buffer fluctuates in a corresponding manner, while frames are withdrawn at a regular rate as determined by the clock in the receiving entity for processing.

In this system then the regular rate as determined by the clock in the receiving entity for processing is still independent from the clock in the transmitting entity nor is it traced on the network clock. The present invention allows synchronization of rate of the receiving entity with that of the transmitting entity.

OBJECTS OF INVENTION

It is therefore an object of the invention to provide a mechanism for multiple data entities to synchronize data rates by which they exchange data through an asynchronous interconnect.

It is another object of the invention to provide a mechanism for a receiving entity to modify its data rate at which it exchanges data with an asynchronous interconnect to that of the transmitting entity.

It is yet a further object of the invention to provide a mechanism for multiple entities to synchronize each other for their data rates where no common timing information is available.

SUMMARY OF INVENTION

Briefly stated, in accordance with one aspect, the invention is directed to a method of synchronizing a system by way of packetized data stream of constant bit rate traffic which is transported through an interconnect where a common timebase is not inherent within the interconnect. The method comprises steps of receiving the packetized data stream from the interconnect and monitoring timing of data packets of the packetized data stream over a predetermined period of time to generate an average data rate and modifying, if necessary, a system clock rate according to the average data rate to synchronize the system.

In accordance with another aspect, the invention is directed to an apparatus for synchronizing a system by way of packetized data stream of constant bit rate traffic which is transported through an interconnect. The apparatus comprises a receiver for receiving the packetized data stream from the interconnect and a counter for generating timing information of the packetized data packets with respect to a received packets over a predetermined period of time. The apparatus further includes a controller for modifying a system clock rate according to the timing information to synchronize the system.

DETAILED DESCRIPTION OF THE PREFERRED EMBODIMENTS OF INVENTION

According to the present invention, two end system can synchronize with one another, when they are exchanging data by constant bit rate traffic through an asynchronous interconnect. The asynchronous interconnect includes asynchronous network as well as such buses as embedded asynchronous buses (e.g. CPCI(Compact PCI), VME, SBUS, PCI bus, ATM and Internet. As mentioned earlier, this solution is not limited to a network but could also be implemented to such industry standard buses mentioned above. PCI bus is widely used in peripherals and this invention would be useful for telephony peripherals attached to a PC. The invention allows two end systems to adjust their bit rate clocks based on the rate of incoming information so that it can maintain synchronization.

Figure 1:
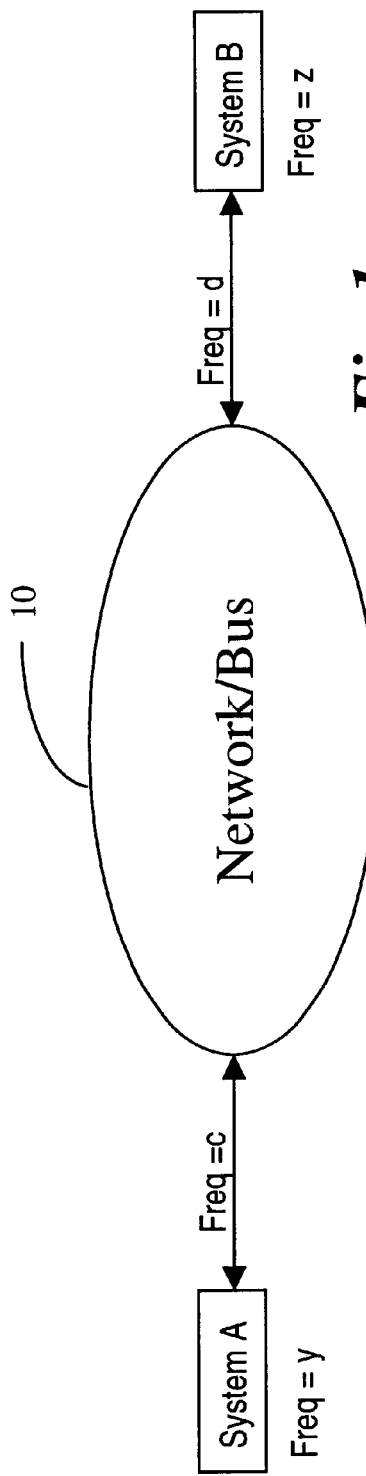
FIG. 1 is a schematic diagram of two systems exchanging data through an interconnect e.g., a network or bus.
Figure 2:
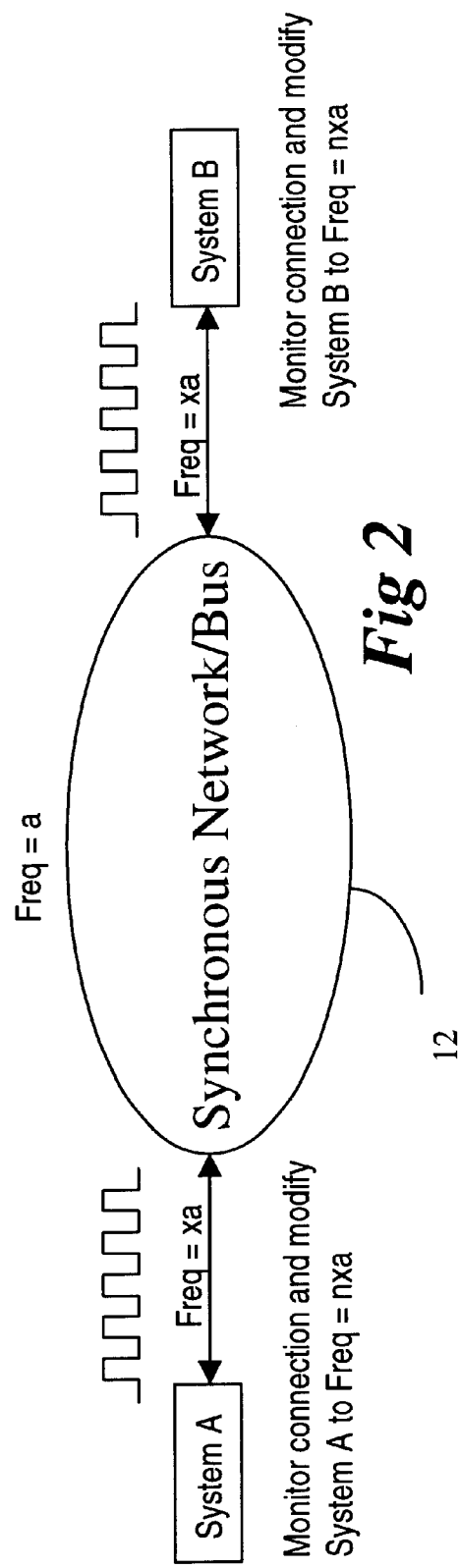
FIG. 2 is a schematic diagram of two systems exchanging data through a synchronous interconnect e.g., a network or bus.
Figure 3:
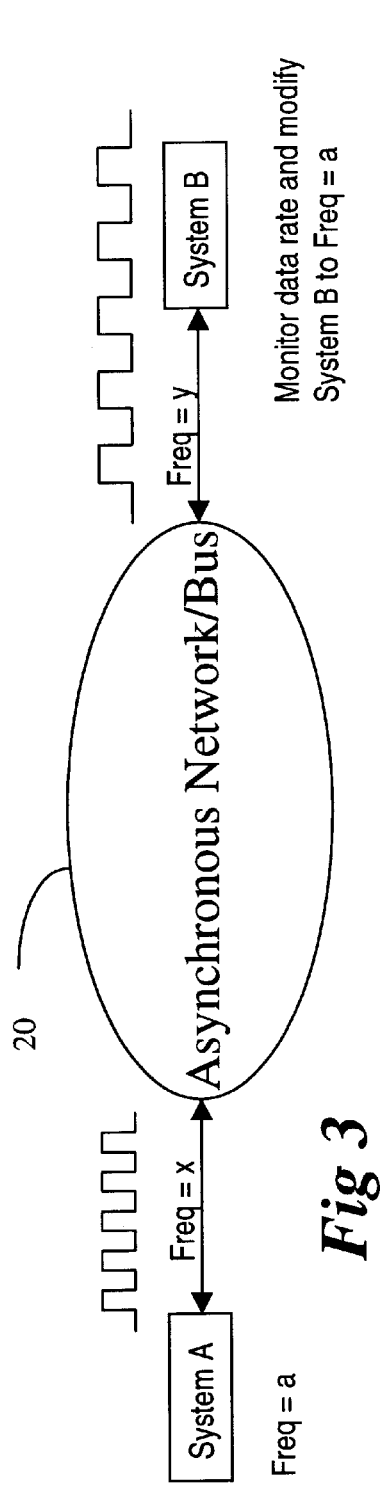
FIG. 3 is a schematic diagram of two systems exchanging data through an asynchronous interconnect e.g., a network or bus.

Referring to FIG. 3, the asynchronous network/bus 20 does not have any common clocks. The connection between system A and the network will not be at the same frequency as system B to the network. System A and system B cannot synchronize to a common network clock to maintain synchronization. However, even though there is no common clock between system A, system B and the network, the rate of data transmission from system A can be considered constant when averaged over time when system A is transmitting a constant bit rate traffic. In the Figure, system A operates at its system clock of frequency a. It exchanges data with the network at a rate of frequency x. Frequency x is dependent upon frequency a. At the other end, the rate the system B receives data from the network thus from system A can also be considered as constant when averaged over time. The network may introduce delay and jitter (delay variation) to the traffic and while packets may arrive at the destination irregularly, the arrival of packets averaged over time should be reasonably constant. Therefore it is possible for system B to monitor the rate of receiving data packets from system A and modify it's system clock to match system A.

For an ATM/IP network, for example, if a voice cell/packet is transmitted every 1 ms, the system can measure the time elapsed between cell/packet and adjust it's clock so that the rate the system reads/writes data is synchronized with the far end. This can be extended to multiple cards over a PCI bus where the receiving card can perform timing measurements on the arrival rate of data.

Figure 4:
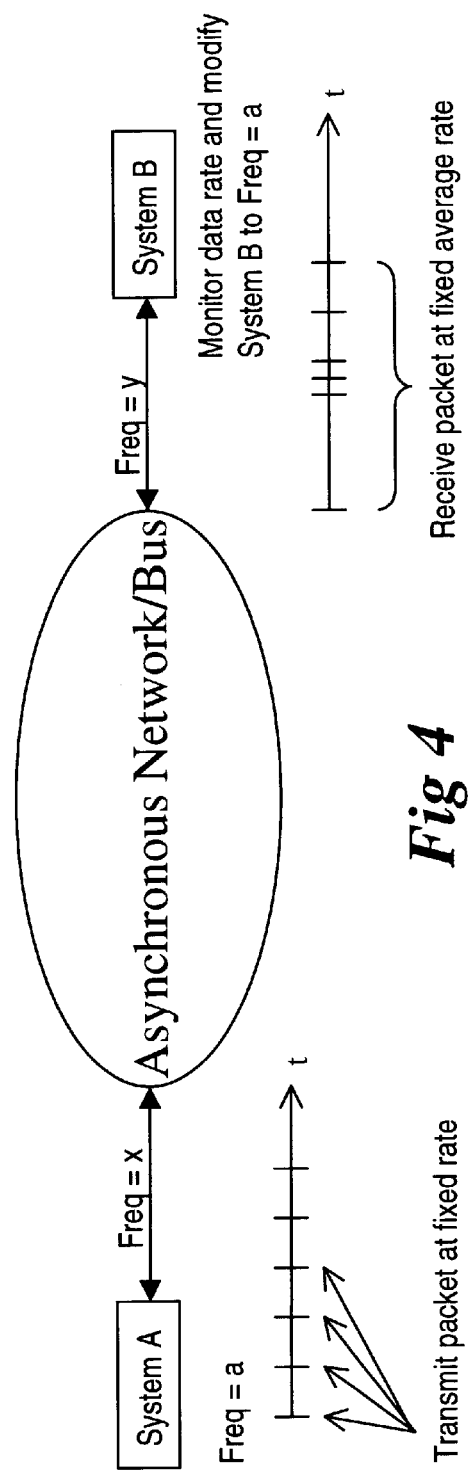
FIG. 4 is a schematic diagram of two systems exchanging data through an asynchronous interconnect e.g., a network or bus and shows a basic concept of synchronization technique of the invention.

FIG. 4 illustrates schematically the basic concept of the invention as applied to a voice call as one example. Data from a voice call from an user on system A gets stored into a 32 byte data packet. For typical PCM voice, this will occur every 4 ms. This process is performed based on the system clock running at frequency a. Every 4 ms measured by the frequency a voice packet is transmitted from system A to system B.

If the call is over a permanent connection that traverses the same path and doesn't encounter any delays, then system B will receive a voice packet every 4 ms. Based on the timing of the received data packet system B will modify it's internal clock to synchronize to system A.

If the call takes different paths or encounters varying delays on each packet (this is common in an asynchronous network), system B will need to buffer the packets to account for packet delay variation. It should however be noted that the arrival of packets averaged over time should be reasonably constant. Thus system B monitors arrival data rate and averages it over a certain time period. System B modifies its system frequency according to this averaged rate to run its system at the same clock rate as system A. In other embodiment, the timing will not be done on a packet by packet basis but on a multi packet to multi packet basis.

Figure 5:
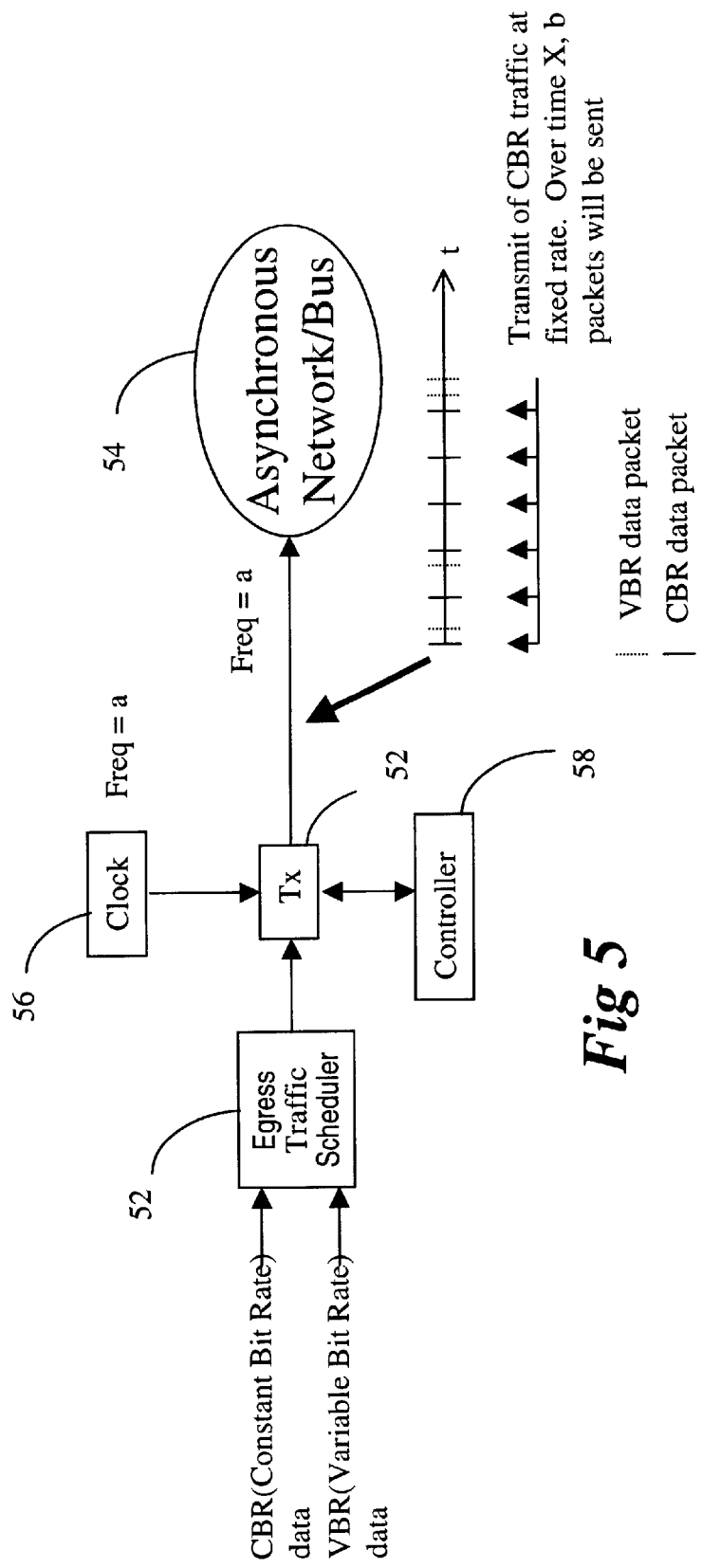
FIG. 5 is a block diagram of a transmitting system according to one embodiment of the invention.
Figure 6:
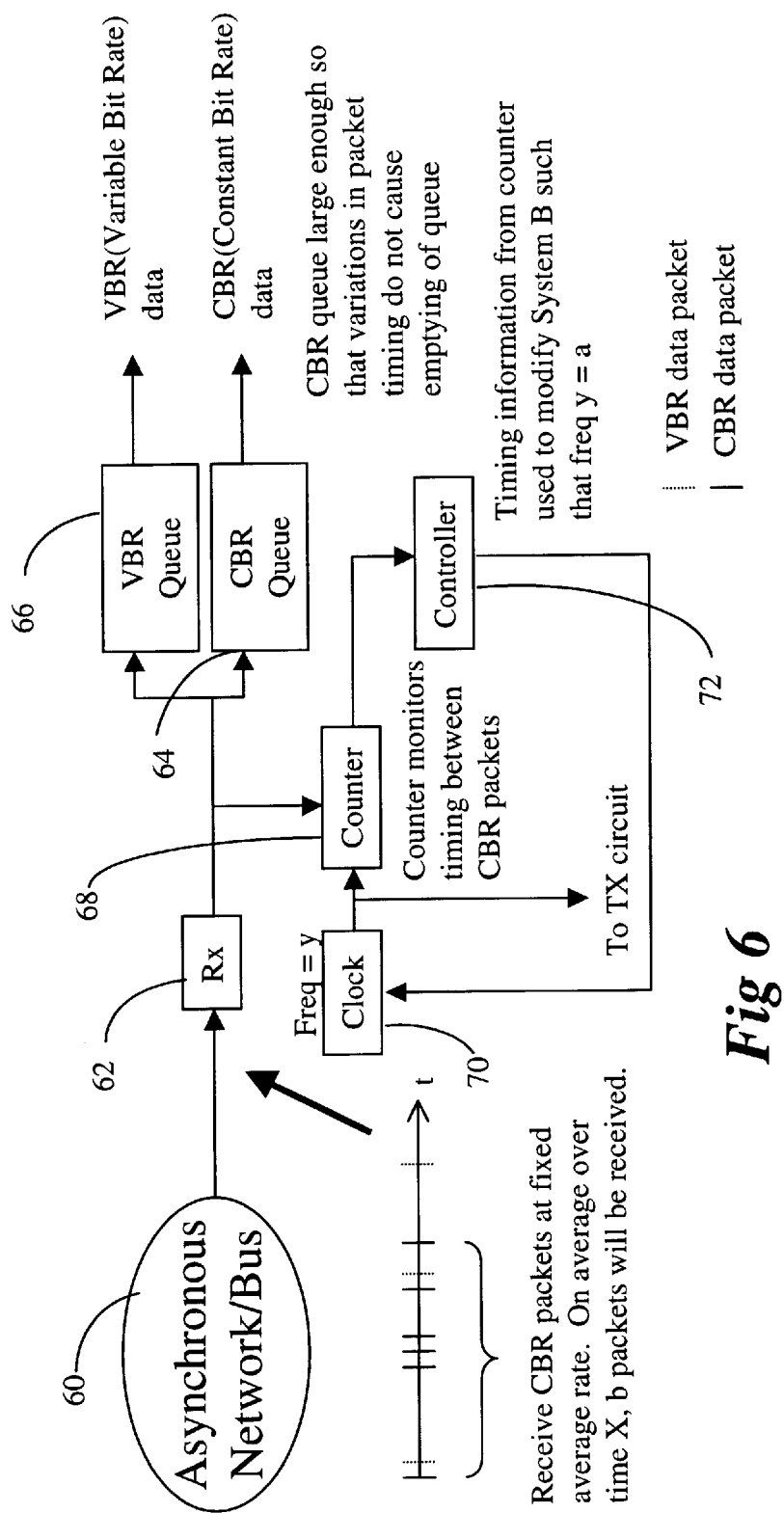
FIG. 6 is a block diagram of a receiving system according to one embodiment of the invention.

FIGS. 5 and 6 show one embodiment in detail in block diagrams which includes the transmitting device and receiving device, both connected to an asynchronous network/bus. In FIG. 5, therefore, a egress traffic scheduler 50 accepts and schedules CBR (constant bit rate) data and VBR (variable bit rate) data for a transmitter 52 to transmit into the asynchronous network or bus 54 at frequency a. Transfer rate into the network is based on frequency a which is tied with the frequency of the system clock 56. Controller 58 controls and coordinates the operations of these modules at the frequency of the system clock. As shown in the figure therefore, in transmitting, VBR data is intermixed with CBR data. CBR data of course is transmitted at fixed rate and over a time period x, b number of CBR packets are sent. Referring to FIG. 6, at the receive end, data received from the network or bus 60 is a mixture of VBR and CBR data. A receiver 62 sends CBR data to CBR queue 64 and VBR data to VBR queue 66. A counter 68 monitors timing between CBR packets under the control of the system clock 70 running at frequency y. Controller 72 modifies the system clock frequency to match frequency a in response to the timing signal from the counter. The timing signal is indicative of the average rate of CBR data over a predetermined period of time. The CBR queue must be large enough to accommodate variations in packet timing. A buffer manager can be provided to manage the size of queues in response to the timing information.

In a yet further embodiment, the packetized data stream of constant bit rate can be made of constant bit rate packets of variable packet size. In this case, the average rate must be weighted to a common base multiple among the packet sizes.

It should be noted that the data transfer size need not be fixed but in fact can be variable. The receiving end needs to convert the data size and timing measurement back to the base level and then adjust it's clock.

What We claim as our invention is:

1. A method of synchronizing a system by way of packetized data stream of constant bit rate traffic which is transported through an interconnect where a common timebase is not inherent within the interconnect comprising:
   receiving the packetized data stream from the interconnect;
   monitoring timing between received data packets of the packetized data stream over a predetermined period of time to generate an average data rate; and
   modifying, if necessary, a system clock rate according to the average data rate to synchronize the system.

2. The method of synchronizing a system, according to claim 1, wherein the monitoring timing comprises measuring arrival times of the received data packets of the packetized data stream from the network.

3. The method of synchronizing a system, according to claim 1, wherein the interconnect comprises one of a telecommunications network and a bus.

4. The method of synchronizing a system, according to claim 1, wherein the monitoring timing comprises counting the number of received data packets over the predetermined period of time.

5. The method of synchronizing a system, according to claim 1, wherein the packetized data stream comprises constant bit rate data and variable bit rate data, the method comprising:
   selecting received data packets of the constant bit rate data; and
   monitoring timing of the received data packets of the constant bit rate data.

6. The method of synchronizing a system, according to claim 5, wherein the monitoring timing of the received data packets of the constant bit rate data comprises counting the number of received data packets of constant bit rate data over the predetermined period of time.

7. The method of synchronizing a system, according to claim 6, wherein the packetized data stream comprises constant bit rate data of variable packet size, and the monitoring timing of the received data packets of the constant bit rate data further comprises generating a weighted average data rate based on the packet sizes of the constant bit rate data.

8. An apparatus for synchronizing a system by way of packetized data stream of constant bit rate traffic which is transported through an interconnect comprising:
   a receiver for receiving the packetized data stream from the interconnect;
   a counter for generating timing information of received data packets of the packetized data stream over a predetermined period of time to generate an average data rate; and
   a controller for modifying a system clock rate according to the timing information to synchronize the system.

9. The apparatus for synchronizing a system according to claim 8 wherein the packetized data stream comprises data packets of constant bit rate data and data packets of variable bit rate data and the counter generates timing information between the data packets of constant bit rate data over the predetermined period of time.

10. The apparatus for synchronizing a system according to claim 9 wherein the counter further comprises:
    a measuring device for monitoring timing between the data packets of constant bit rate data; and
    an averaging device for averaging the timing between the data packets of constant bit rate data over the predetermined period of time to generate the average data rate.

11. The apparatus for synchronizing a system according to claim 10, further comprising a separate queue for the data packets of constant bit rate data and for the data packets of variable bit rate data.

12. The apparatus for synchronizing a system, according to claim 11, wherein the queue comprises a manager for managing queue size based on variations in the timing.

13. The apparatus for synchronizing a system, according to claim 10, wherein the packetized data stream comprises constant bit rate data of variable packet size and the averaging device generates a weighted average data rate based on the packet sizes of the data packets of constant bit rate data.

14. The apparatus for synchronizing a system, according to claim 13, wherein the interconnect comprises one of a telecommunications network and a bus.

15. The apparatus for synchronizing a system according to claim 8 wherein the counter comprises:
    a measuring device for monitoring timing between the data packets of the packetized data stream; and
    an averaging device for averaging the timing between the data packets over the predetermined period of time to generate the average data rate.

16. The apparatus for synchronizing a system according to claim 15 wherein the packetized data stream comprises constant bit rate data of variable packet size.

17. The apparatus for synchronizing a system, according to claim 16, wherein the averaging device generates a weighted average data rate based on the packet sizes of the data packets of constant bit rate data.

18. The apparatus for synchronizing a system, according to claim 17, wherein the interconnect comprises one of a telecommunications network and a bus.

19. A method of synchronizing a system by way of packetized data stream of constant bit rate traffic which is transported through an interconnect where a common timebase is not inherent within the interconnect comprising:

receiving the packetized data stream from the interconnect, the packetized data stream comprising data packets of constant bit rate data of variable packet size and variable bit rate data;

selecting received data packets of the constant bit rate data; and monitoring timing between the received data packets of the constant bit rate data;

monitoring timing between received data packets of the constant bit rate data of the packetized data stream over a predetermined period of time to generate an average data rate, comprising, counting the number of received data packets of constant bit rate data over the predetermined period of time, and generating a weighted average data rate based on the packet sizes of the constant bit data; and modifying, if necessary, a system clock rate according to the average data rate to synchronize the system.

20. An apparatus for synchronizing a system by way of packetized data stream of constant bit rate traffic which is transported through an interconnect comprising:

a receiver for receiving the packetized data stream from the interconnect, the packetized data stream comprising data packets of constant bit rate data of variable packet size and variable bit rate data;

a measuring device for monitoring timing between received data packets of constant bit rate data;

a counter for generating timing information of the received data packets of constant bit rate data over a predetermined period of time; and an averaging device for averaging the timing between the received data packets of constant bit rate data over the predetermined period of time to generate an average data rate, the average data rate comprising a weighted average data based upon packet sized of the received data packets of constant bit rate data; and a controller for modifying a system clock rate according to the timing information to synchronize the system.

21. The apparatus for synchronizing a system, according to claim 20, wherein the interconnect comprises one of a telecommunications network and a bus.

22. An apparatus for synchronizing a system by way of packetized data stream of constant bit rate traffic which is transported through an interconnect comprising:

a receiver for receiving the packetized data stream from the interconnect, the packetized data stream comprising data packets of constant bit rate data of variable packet size;

a counter for generating timing information of received data packets of constant bit rate data over a predetermined period of time, the counter comprising, a measuring device for monitoring timing between the received data packets, and an averaging device for averaging the timing between the received data packets over the predetermined period of time to generate an average data rate, the average data rate comprising a weighted average data rate based on the packet sizes of the received data packets of constant bit rate data; and a controller for modifying a system clock rate according to the timing information to synchronize the system.

23. The apparatus for synchronizing a system, according to claim 22, wherein the interconnect comprises one of a telecommunications network and a bus.

* * * * *